Dec. 29, 1936.        M. F. BATES        2,066,194
AUTOMATIC SPIRALING DEVICE FOR AIRCRAFT
Filed April 27, 1934        3 Sheets-Sheet 2

INVENTOR
MORTIMER F. BATES
BY
Herbert H. Thompson
HIS ATTORNEY

Dec. 29, 1936.  M. F. BATES  2,066,194
AUTOMATIC SPIRALING DEVICE FOR AIRCRAFT
Filed April 27, 1934  3 Sheets-Sheet 3
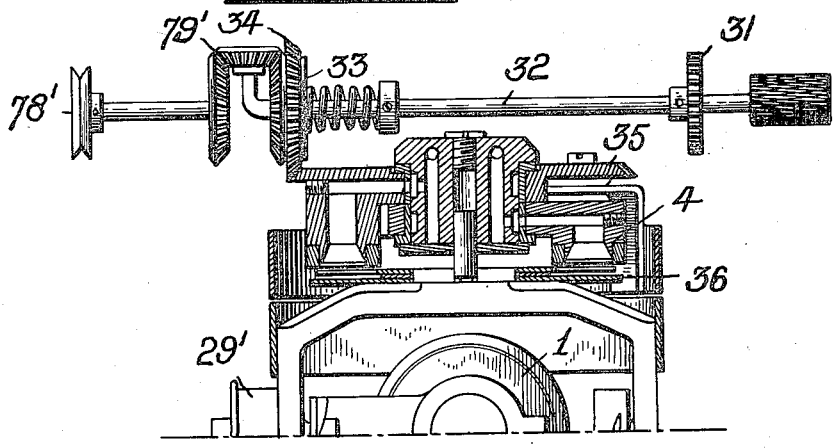
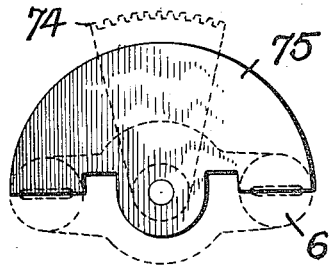
INVENTOR
MORTIMER F. BATES
BY
Herbert H. Thompson
HIS ATTORNEY.

Patented Dec. 29, 1936

2,066,194

UNITED STATES PATENT OFFICE 2,066,194

AUTOMATIC SPIRALING DEVICE FOR AIRCRAFT

Mortimer F. Bates, Brooklyn, N. Y., assignor to Sperry Gyroscope Company, Inc., Brooklyn, N. Y., a corporation of New York Application April 27, 1934, Serial No. 722,703

15 Claims. (Cl. 244—77)

This invention relates to automatic pilots for aircraft and more particularly to a means for causing automatic or semi-automatic ascent or descent of the plane in a spiral or helical path. By means of my invention the aircraft may be caused to spiral upward, for instance, at the will of the aviator and to straighten out on a predetermined course. If desired, both the number of spirals and the course of the airplane may be set before leaving the ground, so that the pilot may be used on a craft without any human pilot. Preferably I accomplish the control through the same directional gyroscope used for automatically steering the craft on a straight course. When so used, the gyroscope is preferably supplemented by a magnetic compass to correct for wandering, as generally outlined in applicant's prior application for Follow-up systems for magnetic compasses, now Patent #2,003,270, dated May 28, 1935. When it is desired to turn, however, the supplemental control of the gyroscope may be transferred from the magnetic compass to a turn device which, operating through the gyroscope, causes the aircraft to turn at a variable rate depending on the setting of the device. Preferably, also, there is incorporated therewith an automatic banking arrangement to bank the craft at the proper angle for the rate of turn. During the turn the craft may be caused to climb through the automatic pilot or otherwise.

Referring to the drawings illustrating several forms my invention may assume,

Figs. 3 and 4 are details of the air pick-off device used on the type of gyroscopes shown.

Figure 1:
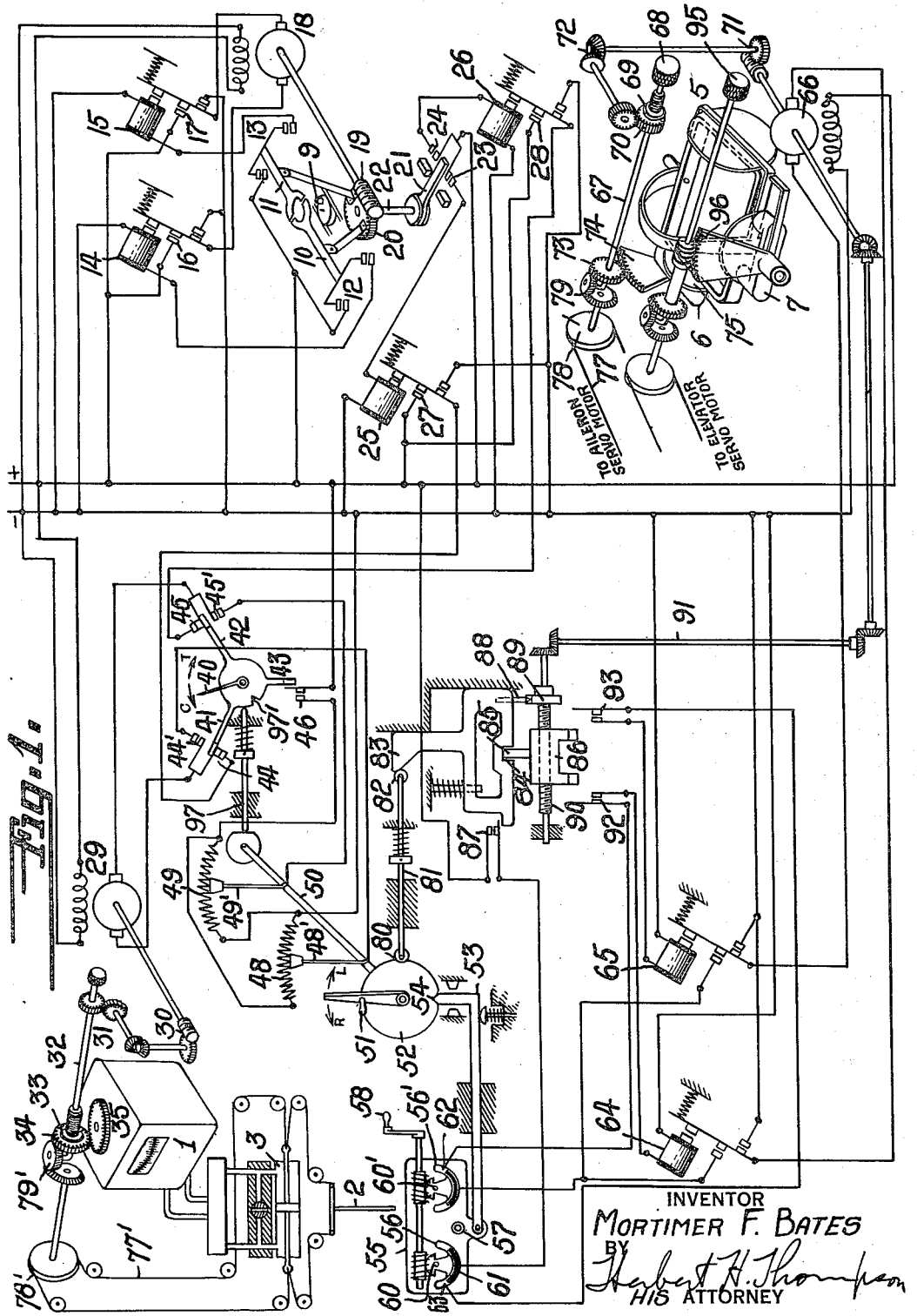
Fig. 1 is a diagram with wiring connections, showing the layout of the various elements of my invention.

My invention is illustrated as applied to the general form of aircraft automatic pilot disclosed in my prior joint application, together with Elmer A. Sperry, Jr. and Bert G. Carlson, on Automatic pilots for aircraft, now Patent #1,992,970, dated March 5, 1935. According to this system the aircraft is controlled in azimuth from a directional gyroscope 1 which governs the rudder 2 through a servo-motor 3 controlled from a suitable air pick-off device 4 (see Figs. 2, 3 and 4) on the gyroscope. Similarly the ailerons and elevator are controlled from a gyroscopic horizon 5 (Fig. 1) which controls the aileron and elevator servo-motors (not shown) through similar air pick-off devices 6 and 7, respectively. Owing to the fact that the directional gyroscope has a tendency to wander, I prefer to supplement the action thereof by a magnetic compass, as outlined in my aforesaid prior Patent #2,003,270. Such a compass element is shown at 8, said element positioning an air jet 9 which acts on balanced paddles 10 and 11 to close one or the other of opposite pairs of contacts 12 and 13, depending on which way the air jet moves. The contacts act through relay coils 14 and 15, respectively, to close contacts 16 and 17 for driving the follow-up or azimuth compass motor 18 in one direction or the other, depending on which contact is closed. Said motor rotates the compass bowl through worm 19 and worm wheel 20 and also rotates the arm 21, through a slip friction mounting on the shaft 22 of the compass bowl, thus closing one or the other of opposite pairs of contacts 23 or 24.

These last named contacts operate, respectively, relay coils 25 and 26, which operate contacts 27 and 28 for normally controlling the motor 29 adjacent the directional gyroscope. Said motor operates through large ratio reduction gearing 30, 31 to turn the shaft 32, which sets the course on the gyroscope. Said shaft is shown as having a friction clutch 33 thereon, coupling the same to a gear 34 meshing with a gear 35 on the top of the gyroscope. The rotation of said gear 35 turns the air pick-off devices 4 with reference to the air cut-off disc 36, as more completely described in the aforesaid Patent #1,992,970, so that the general course is under the control of the magnetic compass, but temporary deviations of the magnetic compass do not affect the same unless they exceed the angular play or loss motion provided between arm 21 and contacts 23, 24, and also owing to the slow rate that the contacts are turned from the magnetic compass. It should also be noted that the magnetic compass is cut out entirely when the craft is turned, which is the time that it is subject to the most serious deviations.

Preferably I bring in the automatic turn device through the same motor 29. To bring the same into action I show a throw-over switch 40 having a plurality of contact arms 41, 42 and 43 connected therewith. When said switch is in the position shown in Fig. 1, namely, in position C, the magnetic compass is in control of the motor 29, because the switches 44 and 45 are closed by the arms 41 and 42, respectively, at that time, while the switch 46 is open. When, however, the switch is thrown to the position T, contacts 44 and 45 are broken and contacts 44', 45' and 46 are made. This severs the connection of motor 29 with the magnetic compass control and connects it to a pair of potentiometers 48 and 49. The movable arms 48' and 49' of said potentiometers are shown as mounted on the shaft 50 of the turn knob or handle 51 and are in the armature circuit of motor 29. When said arms are in the central position, the motor 29 stands still as the current potential is balanced through the armature. When, however, the knob is turned to the left, the motor will be caused to run slowly in a direction to cause the airplane to turn left at the desired rate as long as the handle 51 is held to the left in a fixed position, and vice versa when the arm is turned to the right. The rate of turn may be varied by varying the amount that the handle is turned in either direction, thereby varying the position of the arms 48', 49' on the potentiometers 48, 49. Preferably, however, the motor is always run at a slow speed not to exceed the maximum rate of turn of the craft.

Preferably, means are also provided to cause proper banking of the plane at the same time. To this end, movement of said arm also turns the cam disc 52 connected therewith. Such movement first pulls the L-shaped lever 53 to the right or left, dependent on which way the disc is turned, and then forces it downwardly out of the notch 54, thus turning the support 55 of the mercury pendulums 56, 56' about the pivot 57 in one direction or the other. Said pendulums may be adjusted by turning the knob 58, which is reversely connected to the two pendulums. Each pendulum is pivoted about a center 60, 60' and has a limited amount of mercury 61 in a U-shaped tube in the base thereof and a single contact 62, 63 at the opposite end of each tube.

During normal level flight the mercury does not touch the contact 62 or 63 in either tube. When turning, however, centrifugal force will cause the mercury in the tube on the outside of the curve to contact with the fixed contact therein. Normally these contacts are dead, but when the throw-over switch 51 is thrown to the right or left the contacts are energized through contact 87 as hereinafter described, so that when the mercury contacts with one or the other, one or the other of the bank motor relay magnets 64 and 65 is energized to close the circuit to the armature of the bank motor 66 to turn it in the proper direction to bank the plane until the mercury contact is broken. Tilting the member 55 initiates the bank prior to the turn and also insures the correct banking angle by eliminating the lost motion between the mercury and the contact.

Banking is shown as accomplished through the artificial horizon 5 by means of the same shaft 67, normally used for manually causing banking through the knob 68. As shown, a friction clutch 69 may also be provided between the gear 70 driven from the motor 66 through the reduction gearing 71 and 72 and shaft 67. Said shaft is shown as provided with a gear 73 meshing with a segment 74 which turns the air nozzle member 6 about the fore and aft axis of the gyroscope and with reference to the cut-off disc 75 thereon (see also Fig. 4). The follow-up from the aileron servo-motor is shown as coming in through a cord or belt 77, pulley 78 and differential 79, similar to follow-up cord 77', pulley 78' and differential 79' on the directional gyroscope.

The disc 52 is also preferably provided with a second notch 80 so that when it is turned it forces the rod 81 to the right to bring into action mechanism for rendering the automatic banking contacts operative and also for restoring the contacts to the normal or level flying condition upon completion of a turn. When said rod 81 is forced to the right, the roller 82 on the end thereof lifts the slide 83, thereby disengaging notch 84 in the base thereof from a pin 85 on a traveling nut 86. The raising of said slide also causes contact 87 to energize the mercury contacts and also lifts pin 88 out of a notch in a collar 89 on shaft 90, which is threaded in said nut 86. Said shaft is rotated from the banking motor 66 through connecting shafts 91 so that as said motor rotates, the nut 86 travels to the right or left and breaks one or the other of normally closed contacts 92, 93 to act as means for limiting the amount of bank. The simultaneous climbing of the craft to produce a spiral may be controlled by thumb piece 95, which shifts the relative position of nozzle member 7 through worm 96.

When the turn is complete and it is desired to straighten out the craft on its final course, lever 51 is moved to its mid position and the switch 40 is moved to the left, thus causing the motor 29 to be controlled from the magnetic compass. As the turning ceases, centrifugal force will cease to act on the mercury and contact will be made on the low side so as to turn the motor 66 in the opposite direction. This will bring the nut 86 back towards the middle and as soon as notch 84 is reached, the slide 83 will drop in said notch and pin 90 in notch 89, thus stopping the bank motor with the part 6 in its normal position for level flight.

An interlock may be provided between controllers 40 and 51 to prevent the former being moved from the turn to the straight flight position until the latter is centralized and to lock the latter when the former is in the straight flight position. This is shown in the form of a spring pressed pin 97 which, when handle 40 is turned to T, drops in a notch 97'. At its outer end said pin, in the position shown in Fig. 1, bears against a flattened side of cam disc 98 on shaft 50, but when pin 97 drops in notch 97', handle 51 may be turned. Conversely, when said handle is turned to the right or left, handle 40 is locked by pin 97 in notch 97'.

It is obvious that the change of course may be effected through the gyroscope in other ways than that illustrated. Thus, instead of using the motor 29 to turn the controller alone, it may be used as a torque device 29', as shown in Fig. 3, to apply a weak torque about the horizontal axis of the gyroscope 1 to cause slow precession in azimuth, as outlined in the prior patent to Elmer A. Sperry, Jr., No. 1,982,702, dated December 4, 1934, for Gyro-pilots for aircraft. In either case the effect is the same, and the magnetic compass may be used to prevent deviation due to the tendency of the gyroscope to wander.

Figure 2:
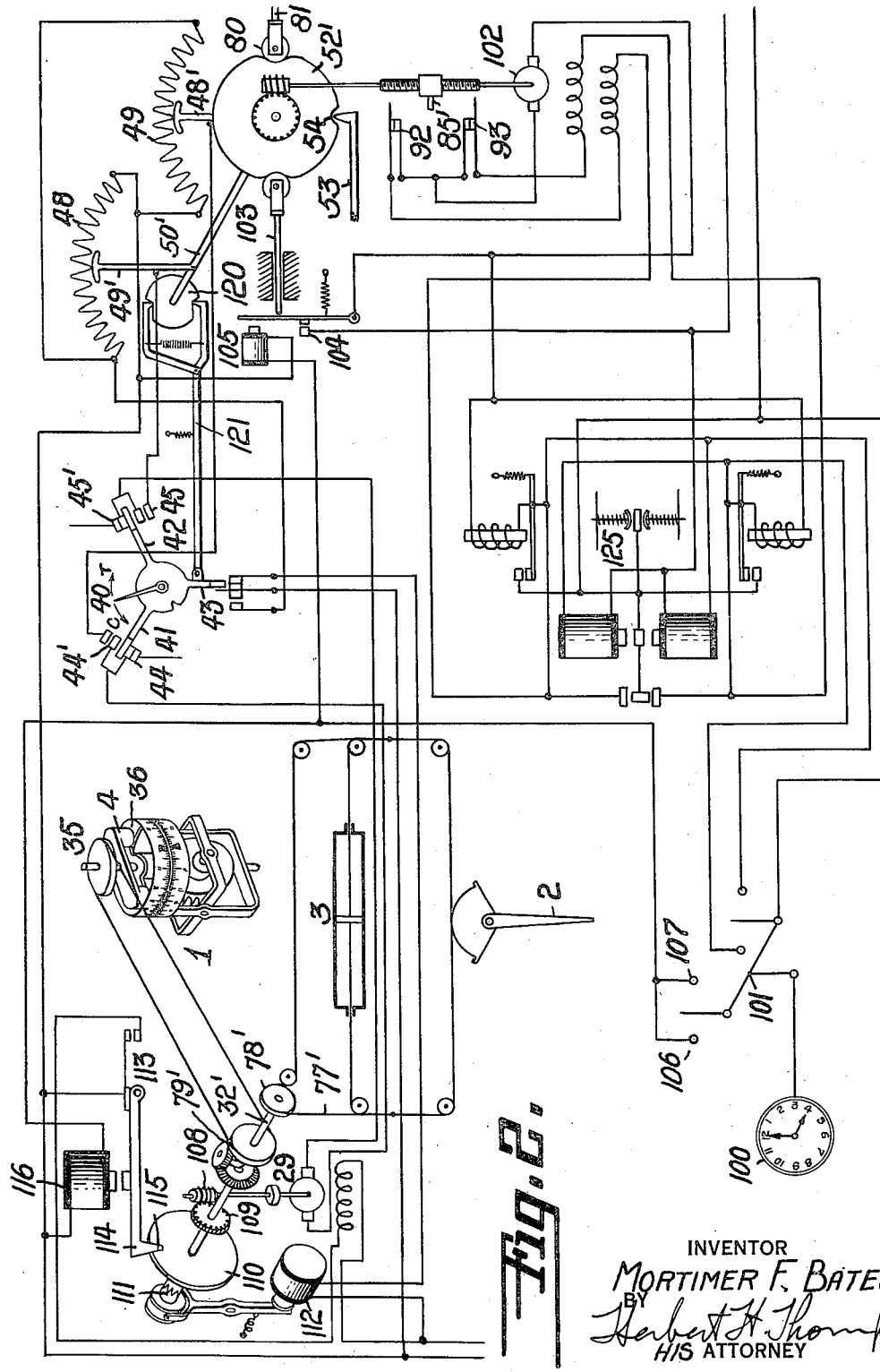
Fig. 2 is a similar diagram of a modification which may be used with complete automatic flight.

It is obvious that my invention may also be applied to a completely automatic pilot which may be flown without a human pilot. Fig. 2 illustrates one method of modifying the device to this end, the corresponding parts being correspondingly numbered. In this figure only the directional gyroscope control is illustrated, it being understood that the horizon gyroscope control may remain as shown in the other figure. Also no attempt is made to show other elements of a complete automatic control, such as the height control means for controlling the height at which the plane flies, etc., these elements being known in the prior art.

According to this form of the invention, the number of spirals made by the craft is under the control of a timing or counting mechanism or remote control device 100 which may be set to start the spiraling operation within a predetermined time after launching. The timing mechanism throws double pole, double throw switch 101 in one direction or the other, depending on in which direction it is set for spiraling. This operation starts the motor 102, through interlocking relay 125 in the proper direction, which turns the disc 52' and its shaft 50' to move the rheostat arms 48', 49' to the right or left, as in Fig. 1. The turning of the disc may operate the same parts as shown by the similar numerals in Fig. 1 and may also turn a disc 120 on shaft 50' to throw switch 40 to the turn position through a latch 121. Disc 52' also pushes to the left a rod 103 to close a switch 104 in the armature circuit of the motor 102. Said switch is also closed by the excitation of electromagnet 105 in series with contacts 106, 107 at switch 101. The purpose of this switch is to cause the motor 102 to run the disc 52 back to its central position when switch 101 is open.

The motor 29 is brought into acton as before to turn the follow-up system 35 on the gyro slowly and continuously, and the throwing of the switch 40 to the position T operates the motor through the Wheatstone bridge resistances 48 and 49 as before. The motor is shown as connected to the shaft 32' through a worm 108 and a worm wheel 109. Loosely mounted on shaft 32' is a notched disc 110 which is clutched to said shaft through jaw clutch 111. Said clutch is spring engaged and may be under the control of electromagnet 112, the circuit through which is broken when the switch 40 is on position T. It should also be noted that the field of the motor 29 is placed in a circuit with switch 113, which is open when the pawl 114 engages the notch 115 therein and when electromagnet 116 is de-energized. When, however, magnet 116 is energized by the closing of switch 106, 107, or when the disc 110 is turned so that said pawl does not engage said notch, switch 113 will remain closed. This insures the disc, now clutched to the shaft, being brought back to the original starting position and terminates the spiral on the original heading, since the motor will keep running until the disc turns the notch 115 under the pawl 114. After the predetermined number of turns are completed, the clock mechanism throws the switch 101 back to the off position. Thus the craft will straighten out on its originally set course. It will be understood that the automatic climb mechanism (not shown) should be synchronously thrown out, preferably by the same timing mechanism 100 or by a height responsive means, referred to above as known per se in the prior art. See patent to Lawrence B. Sperry, No. 1,418,605, dated June 6, 1922, for aerial torpedoes. Since the rate of climb is known, the height to which the plane will climb in a predetermined time or number of turns can be predetermined.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic pilot for aircraft, the combination with a directional base line, a servo-motor and a rudder, of control elements actuated by said base line and servo-motor, the relative position of which governs the servo-motor, motive means for continuously shifting the relative position of said elements, whereby a continuous turn is caused, and means for varying the rate of turn at will.

2. In a spiraling device for aircraft automatic pilots, the combination with directional and horizon gyroscopes, servo-motors and rudders, of control elements actuated by each and their respective servo-motors, for governing the steering, banking and elevator servo-motors, means for altering the relative position of the horizon elements to cause banking, climbing or diving, means for slowly and continuously shifting the relative position of said directional elements, whereby spiraling is caused, a level device for detecting turning, and means controlled thereby for altering the relative position of said horizon elements to cause banking at the proper angle during a turn.

3. In an automatic pilot for aircraft, the combination with a directional gyroscope, a servo-motor and a rudder, of control elements actuated by said gyroscope and servo-motor, the relative position of which governs the servo-motor, a magnetic compass for normally preventing any wandering tendency of said gyroscope from causing deviation from course, a manually controlled device for causing turning of the craft through said gyroscope, and means for transferring the control of said gyroscopic control elements from said magnetic compass to said manual means at will.

4. In an automatic pilot for aircraft, the combination with a directional gyroscope, a servo-motor and a rudder, of control elements actuated by said gyroscope and servo-motor, the relative position of which governs the servo-motor, a magnetic compass for shifting the relative position of said elements in case said gyroscope wanders, motive means for continuously shifting the relative position of said elements for causing turning, and means for transferring the control of said elements between said magnetic compass and said motive means to cause either straight flight or continuous turning at will.

5. In an automatic pilot for aircraft, the combination with a directional base line, a servo-motor and a rudder, of control elements actuated by said base line and servo-motor, the relative position of which governs the servo-motor, motive means for continuously shifting the relative position of said elements, whereby a continuous turn is caused, turn detecting means and means brought into action by the actuation of said turn detecting means for causing automatic banking of the craft during a turn at the correct banking angle.

6. In an automatic pilot for aircraft, the combination with directional and horizon gyroscopes, servo-motors and rudders, of control elements actuated by each and their respective servo-motors, means operable at will for continuously shifting the relative position of said directional elements to cause turning, normally inoperative turn detecting means, means brought into operation by said first named means for rendering said turn detecting means operative, and means controlled by said turn detecting means for altering the relative position of the horizon elements to cause proper banking at an angle proportional to the rate of turn.

7. An automatic pilot as claimed in claim 6, in which means are provided for throwing out said turn detecting means to eliminate the banking and bring the craft back to its level position when the turn is stopped.

8. In an automatic pilot for aircraft, the combination with a directional gyroscope, a servomotor and a rudder, of control elements actuated by said gyroscope and servo-motor, the relative position of which governs the servo-motor, a magnetic compass for normally preventing any wandering tendency of said gyroscope from causing deviation from course, a manually controlled device for causing turning of the craft through said gyroscope, motive means for slowly turning said elements with respect to said gyroscope, and means for governing said motive means either from said compass or said device at will.

9. In an automatic pilot for aircraft, the combination with directional and stabilizing base lines and servo-motors, of azimuth and elevation control elements actuated by said base lines, and servo-motors, the relative position of which governs the servo-motors, means for setting the elevation control element to cause climbing, motive means for continuously shifting the relative position of said azimuth control elements, whereby a continuous turn is caused, and automatic means for throwing out said turn and climb means after a predetermined number of turns has been made, whereby the craft may be caused to spiral upward to a predetermined height and then to straighten out on its predetermined level course.

10. In a navigational device for aircraft, a directional gyroscope by which the course is normally maintained, a magnetic compass, means actuated thereby for preventing deviation due to wandering of the gyroscope, means for causing turning of the craft through said gyroscope, and means for rendering said compass actuated means inoperative while said last named means operates.

11. In an automatic pilot for aircraft, the combination with a directional base line, a servomotor and a rudder, of control elements actuated by said base line and servo-motor, the relative position of which governs the servo-motor, motive means for continuously shifting the relative position of said elements, whereby a continuous turn is caused, and automatic means for throwing out said turn means after a predetermined number of turns has been made, including means for locking the control elements in their originally set position when the turn is completed, whereby the craft will fly on the originally set course.

12. In an automatic steering device for dirigible vehicles, the combination with a free gyroscope, a magnetic compass and a controller normally under the control of both said gyroscope and compass, of means for preventing said compass from disturbing said controller due to temporary deviations thereof, including means for severing the control connections between said compass and controller during a turn.

13. In an automatic steering device for dirigible vehicles, the combination with a free gyroscope, a magnetic compass and a controller normally under the control of both said gyroscope and compass, of means for preventing said compass from disturbing said controller due to temporary deviations thereof, including a lost motion device and reduction gearing in the control connections between said compass and controller.

14. A course determining means for aircraft comprising a gyroscope of the directional or three degree of freedom type and a magnetic compass, both of which normally operate together to control said means, and means for severing the control from the compass during a turn to prevent deviation due to compass deflection at that time.

15. In an automatic pilot for aircraft, the combination with a directional base line, a servo motor and a rudder, of control elements actuated by said base line and servo motor, the relative position of which governs the servo motor, and motive means for continuously shifting the relative position of said elements at a uniform rate, whereby a continuous turn at a constant rate is caused.

MORTIMER F. BATES.